US011580247B2

(12) United States Patent
Coady et al.

(10) Patent No.: US 11,580,247 B2
(45) Date of Patent: Feb. 14, 2023

(54) SYSTEMS AND METHODS FOR QUANTUM FILE PERMISSIONS

(71) Applicant: Red Hat, Inc., Raleigh, NC (US)

(72) Inventors: Stephen Coady, Waterford (IE); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 260 days.

(21) Appl. No.: 16/912,200

(22) Filed: Jun. 25, 2020

(65) Prior Publication Data

US 2021/0406392 A1 Dec. 30, 2021

(51) Int. Cl.
G06F 21/62 (2013.01)
G06N 10/00 (2022.01)
G06F 16/23 (2019.01)

(52) U.S. Cl.
CPC ...... *G06F 21/6227* (2013.01); *G06F 16/2379* (2019.01); *G06N 10/00* (2019.01)

(58) Field of Classification Search
CPC .. G06F 21/6227; G06F 16/2379; G06F 21/60; G06F 21/62; G06F 21/6209; G06F 21/6218; G06N 10/00; H04L 63/10; H04L 63/101; H04L 63/102; H04L 63/105
See application file for complete search history.

(56) References Cited

U.S. PATENT DOCUMENTS

| 6,684,210 | B1 * | 1/2004 | Takechi | G06F 21/6218 |
| | | | | 707/999.009 |
| 7,451,292 | B2 | 11/2008 | Routt | |
| 7,639,035 | B2 | 12/2009 | Berkley | |
| 7,853,011 | B2 | 12/2010 | Kuang et al. | |

(Continued)

FOREIGN PATENT DOCUMENTS

| CN | 105164704 B | 7/2018 |
| CN | 109816112 A | 5/2019 |

(Continued)

OTHER PUBLICATIONS

Notice of Allowance for U.S. Appl. No. 16/227,747, dated Jun. 10, 2021, 7 pages.

(Continued)

*Primary Examiner* — Malcolm Cribbs
(74) *Attorney, Agent, or Firm* — Dority & Manning, P.A.

(57) ABSTRACT

Providing quantum file permissions is disclosed herein. In one example, a quantum computing device includes a permissions database that stores permissions information for a plurality of quantum files. A quantum file permissions service, executing on a processor device of the quantum computing device, receives from a requestor a permissions query for a permissions status (i.e., a read permission indicator, a write permission indicator, and/or an execute permission indicator, as non-limiting examples) of a quantum file including a plurality of qubits. In response, the quantum file permissions service accesses permissions information for the quantum file from the permissions database. The quantum file permissions service uses the permissions information from the permissions database to determine a permissions status of the quantum file. The quantum file permissions service then sends a response to the requestor indicating the permissions status of the quantum file.

20 Claims, 9 Drawing Sheets

(56) References Cited

U.S. PATENT DOCUMENTS

| | | | |
|---|---|---|---|
| 8,102,185 | B2 | 1/2012 | Johansson et al. |
| 8,434,027 | B2 | 4/2013 | Jones |
| 8,600,051 | B2 | 12/2013 | Noh |
| 8,959,115 | B2 | 2/2015 | Marathe |
| 9,264,226 | B2 | 2/2016 | Harrison et al. |
| 9,495,644 | B2 | 11/2016 | Chudak et al. |
| 9,509,506 | B2 | 11/2016 | Hughes et al. |
| 9,537,953 | B1* | 1/2017 | Dadashikelayeh ... H04L 41/046 |
| 9,774,401 | B1 | 9/2017 | Borill |
| 9,847,913 | B2 | 12/2017 | Kanda et al. |
| 9,887,976 | B2 | 2/2018 | Hughes et al. |
| 10,331,658 | B2 | 6/2019 | Pennefather et al. |
| 10,592,216 | B1 | 3/2020 | Richardson et al. |
| 2003/0121028 | A1 | 6/2003 | Coury et al. |
| 2005/0193221 | A1* | 9/2005 | Yoneyama .......... G06F 21/6218 726/5 |
| 2012/0093521 | A1 | 4/2012 | Harrison et al. |
| 2013/0308956 | A1 | 11/2013 | Meyers et al. |
| 2014/0365843 | A1 | 12/2014 | Ashikhmin |
| 2016/0071021 | A1 | 3/2016 | Raymond |
| 2017/0351974 | A1 | 12/2017 | Rose et al. |
| 2018/0091440 | A1 | 3/2018 | Dadashikelayeh et al. |
| 2018/0144262 | A1 | 3/2018 | Roetteler et al. |
| 2018/0336371 | A1* | 11/2018 | Fortmann ........... G06F 21/6281 |
| 2018/0365585 | A1 | 12/2018 | Smith et al. |
| 2019/0042971 | A1 | 2/2019 | Zou |
| 2019/0179730 | A1 | 6/2019 | Geller et al. |
| 2020/0074346 | A1 | 3/2020 | Griffin et al. |
| 2020/0125402 | A1 | 4/2020 | Griffin et al. |
| 2020/0184025 | A1 | 6/2020 | Horii et al. |
| 2020/0184031 | A1 | 6/2020 | Horii |
| 2020/0201655 | A1 | 6/2020 | Griffin et al. |
| 2020/0227522 | A1 | 7/2020 | Leipold et al. |
| 2020/0313063 | A1 | 10/2020 | Pollanen et al. |
| 2020/0374211 | A1 | 11/2020 | Griffin et al. |
| 2020/0387821 | A1 | 12/2020 | Griffin et al. |
| 2021/0027188 | A1 | 1/2021 | Nickerson et al. |
| 2021/0036846 | A1 | 2/2021 | Grice et al. |
| 2021/0058243 | A1 | 2/2021 | Starodubtsev |

FOREIGN PATENT DOCUMENTS

| | | | |
|---|---|---|---|
| JP | 6465876 | B2 | 2/2019 |
| WO | 2016206498 | A1 | 12/2016 |
| WO | 2018111242 | A1 | 6/2018 |

OTHER PUBLICATIONS

Barnum, H. et al., "Authentication of Quantum Messages," Proceedings of the 43rd Annual IEEE Symposium on Foundations of Computer Science, Nov. 2002, IEEE, 10 pages.

Bushwick, S., "New Encryption System Protects Data from Quantum Computers," Scientific American, Oct. 8, 2019, https://www.scientificamerican.com/article/new-encryption-system-protects-data-from-quantum-computers/, 5 pages.

Chen, S., "What if Quantum Computers Used Hard Drives made of DNA?" Wired, Mar. 15, 2017, https://www.wired.com/2017/03/quantum-computers-used-hard-drives-made-dna/, 10 pages.

Choi, C., "A Data Bus for Quantum Computers," IEEE Spectrum, Nov. 9, 2017, https://speclium.ieee.org/tech-talk/computing/hardware/a-quantum-bus-for-quantum-computers, 3 pages.

Gühne, O., et al., "Entanglement detection," Physics Reports, vol. 474, No. 1, Feb. 27, 2009, 90 pages.

Lee, C., "New form of qubit control may yield longer computation times," Ars Technica, Jan. 26, 2018, Wired Media Group, 5 pages.

Mina, M., et al., "EntangleNet: Theoretical Reestablishment of Entanglement in Quantum Networks," Applied Science, vol. 8, Issue 10, Oct. 16, 2018, 17 pages.

Pathumsoot, P., et al., "Modeling of Measurement-based Quantum Network Coding on IBM Q Experience Devices," arXiv: 1910.00815v2 [quant-ph], Nov. 12, 2019, 10 pages.

Schoute, E., et al., "Shortcuts to Quantum Network Routing," Jul. 9, 2016, available online at https://obj.umiacs.umd.edu/extended_abstracts/QCrypt_2016_paper_203.pdf, 2 pages.

Sillanpaa, M. et al., "Coherent quantum state storage and transfer between two phase qubits via a resonant cavity," Nature, vol. 449, Sep. 2007, Nature Publishing Group, pp. 438-442.

Toyoizumi, H., "Performance Evaluation of Quantum Merging: Negative Queue Length," Waseda University, accessed Apr. 2020 from http://www.f.waseda.jp/toyoizumi/research/papers/Performance%20Evaluation%20of%20Quantum%20Merging%20Negative.pdf, 5 pages.

Yamasaki, H. et al., "Quantum State Merging for Arbitrarily Small-Dimensional Systems," IEEE Transactions on Information Theory, vol. 65, No. 6, Jun. 2019, IEEE, pp. 3950-3972.

Yang, C., et al., "Entanglement generation and quantum information transfer between spatiallY-separated qubits in different cavities," New Journal of Physics, vol. 15, Nov. 1, 2013, 19 pages.

Cheng, S.T. et al., "Quantum Switching and Quantum Merge Sorting," IEEE Transactions on Circuits and Systems 1 Regular Papers, vol. 53, Issue 2, Feb. 2006, IEEE, 10 pages.

Whitehouse, L., "Data deduplication methods: Block-level versus byte-level dedupe," Nov. 24, 2008, https://www.techtarget.com/searchdatabackup/tip/Data-deduplication-methods-Block-level-versus-byte-level-dedupe, 2 pages.

Applicant-Initiated Interview Summary for U.S. Appl. No. 15/930,025, dated Dec. 17, 2021, 3 pages.

Non-Final Office Action for U.S. Appl. No. 16/912,091, dated Jan. 27, 2022, 14 pages.

Non-Final Office Action for U.S. Appl. No. 15/930,025, dated Oct. 1, 2021, 10 pages.

Non-Final Office Action for U.S. Appl. No. 16/859,571, dated Oct. 28, 2021, 9 pages.

* cited by examiner

PERMISSIONS DATABASE 84

| QUANTUM FILE IDENTIFIER 88(0) | READ PERMISSION INDICATOR 90(0) | WRITE PERMISSION INDICATOR 92(0) | EXECUTE PERMISSION INDICATOR 94(0) |
|---|---|---|---|

PERMISSIONS DATABASE ENTRY 86(0)

. . .

| QUANTUM FILE IDENTIFIER 88(P) | READ PERMISSION INDICATOR 90(P) | WRITE PERMISSION INDICATOR 92(P) | EXECUTE PERMISSION INDICATOR 94(P) |
|---|---|---|---|

PERMISSIONS DATABASE ENTRY 86(P)

*FIG. 3*

SYSTEMS AND METHODS FOR QUANTUM FILE PERMISSIONS

BACKGROUND

Quantum computing involves the use of quantum bits, referred to herein as "qubits," each of which has properties (such as superposition and entanglement) that differ from those of non-quantum bits used in classical computing. As quantum computing continues to increase in popularity and become more commonplace, an ability to programmatically manipulate quantum files comprising a plurality of qubits will be desirable.

SUMMARY

The examples disclosed herein implement a quantum file management system that provides quantum file permissions. A quantum computing device includes a permissions database that stores permissions information for a plurality of quantum files. In one example, a quantum file permissions service, executing on a processor device of the quantum computing device, receives from a requestor a permissions query for a permissions status (i.e., a read permission indicator, a write permission indicator, and/or an execute permission indicator, as non-limiting examples) of a quantum file including a plurality of qubits. In response, the quantum file permissions service accesses permissions information for the quantum file from the permissions database. The quantum file permissions service uses the permissions information from the permissions database (along with, e.g., information indicating ownership of the quantum file, information indicating whether the quantum file is in use, information indicating an entanglement status, a superposition status, and/or a superdense status for each qubit of the plurality of qubits, and/or information indicating whether the plurality of qubits are stored locally, according to some examples) to determine a permissions status of the quantum file. The quantum file permissions service then sends a response to the requestor indicating the permissions status of the quantum file. In some examples, the quantum file permissions service may also receive a permissions update request from the requestor, and, in response, may update a permissions database entry corresponding to the quantum file in a permissions database based on the permissions update request.

In another example, a method for accessing quantum file permissions is provided. The method includes receiving, from a requestor, a permissions query for a permissions status of a quantum file including a plurality of qubits. The method further includes, in response to receiving the permissions query, accessing permissions information for the quantum file from a permissions database. The method also includes determining, based on the permissions information, the permissions status of the quantum file, wherein the permissions status includes one or more of a read permission indicator, a write permission indicator, and an execute permission indicator for the quantum file. The method additionally includes sending a response to the requestor indicating the permissions status.

In another example, a quantum computing system for accessing quantum file permissions is provided. The quantum computing system includes a quantum computing device including a memory and at least one processor device coupled to the memory. The at least one processor device is to receive, from a requestor, a permissions query for a permissions status of a quantum file comprising a plurality of qubits. The at least one processor device is further to, in response to receiving the permissions query, access permissions information for the quantum file from a permissions database. The at least one processor device is also to determine, based on the permissions information, the permissions status of the quantum file, wherein the permissions status includes one or more of a read permission indicator, a write permission indicator, and an execute permission indicator for the quantum file. The at least one processor device is additionally to send a response to the requestor indicating the permissions status.

In another example, a computer program product is provided. The computer program product includes a non-transitory computer-readable medium having stored thereon computer-executable instructions which, when executed, cause a processor device to receive, from a requestor, a permissions query for a permissions status of a quantum file comprising a plurality of qubits. The computer-executable instructions further cause the processor device to, in response to receiving the permissions query, access permissions information for the quantum file from a permissions database. The computer-executable instructions also cause the processor device to determine, based on the permissions information, the permissions status of the quantum file, wherein the permissions status includes one or more of a read permission indicator, a write permission indicator, and an execute permission indicator for the quantum file. The computer-executable instructions additionally cause the processor device to send a response to the requestor indicating the permissions status.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 3 is a block diagram illustrating a permissions database of FIG. 1 and constituent elements thereof, according to some examples;

DETAILED DESCRIPTION

Figure 1:
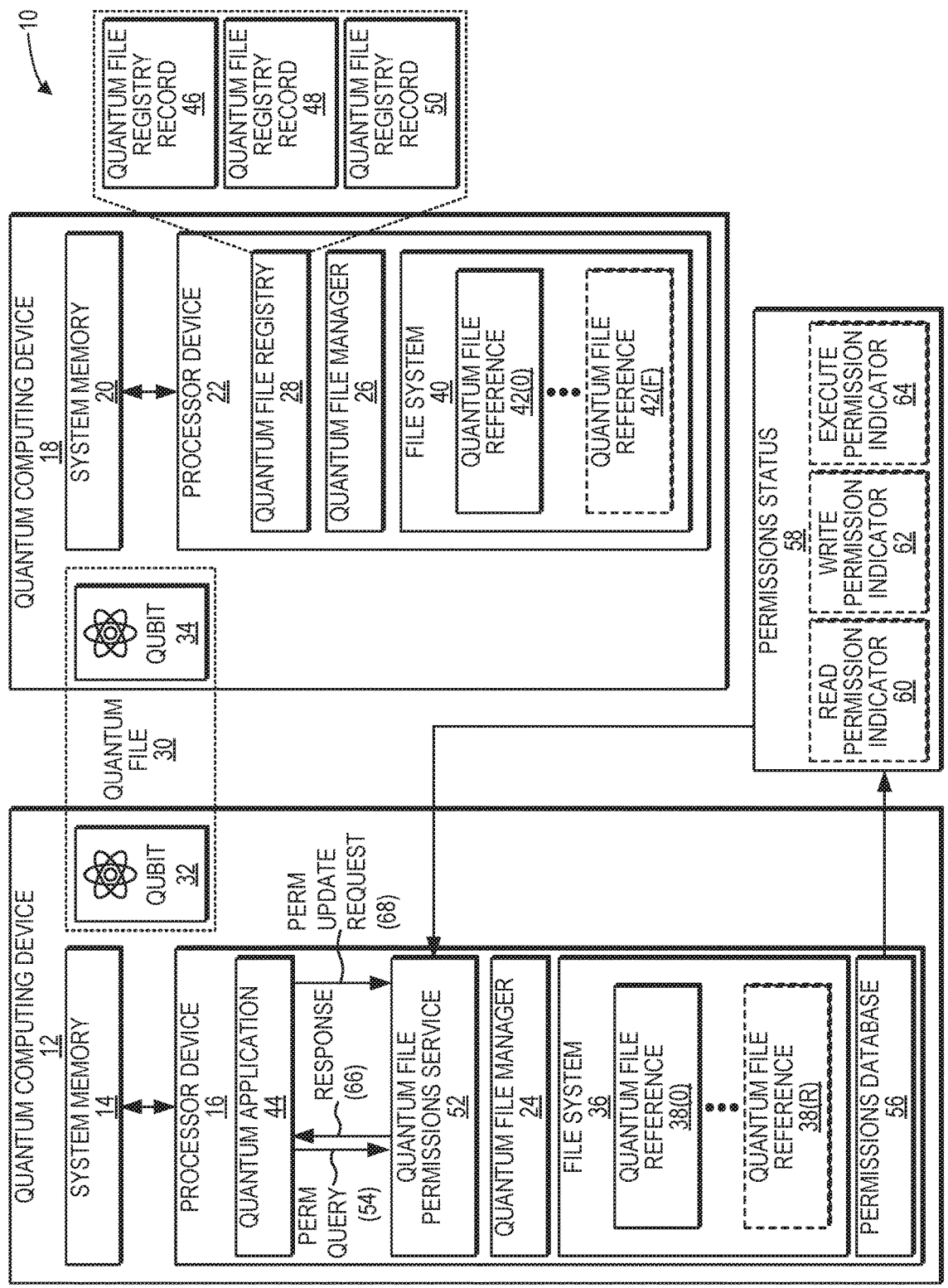
FIG. 1 is a block diagram of a quantum computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," each of which has properties (such that superposition and entanglement) that differ from those of classical (i.e., non-quantum) bits used in classical computing. As quantum computing continues to increase in popularity and become more commonplace, an ability to programmatically manipulate quantum files comprising a plurality of qubits will be desirable.

In this regard, the examples disclosed herein implement a quantum file management system that provides quantum file permissions. A quantum computing device includes a permissions database that stores permissions information for a plurality of quantum files. In one example, a quantum file permissions service, executing on a processor device of the quantum computing device, receives from a requestor a permissions query for a permissions status (e.g., a read permission, a write permission, and/or an execute permission, as non-limiting examples) of a quantum file including a plurality of qubits. In response, the quantum file permissions service accesses permissions information for the quantum file from the permissions database. The quantum file permissions service uses the permissions information from the permissions database (along with, e.g., information indicating ownership of the quantum file, information indicating whether the quantum file is in use, information indicating an entanglement status, a superposition status, and/or a superdense status for each qubit of the plurality of qubits, and/or information indicating whether the plurality of qubits are stored locally, according to some examples) to determine a permissions status of the quantum file. The quantum file permissions service then sends a response to the requestor indicating the permissions status of the quantum file. In some examples, the quantum file permissions service may also receive a permissions update request from the requestor, and, in response, may update a permissions database entry corresponding to the quantum file in a permissions database based on the permissions update request.

FIG. 1 is a block diagram of a quantum computing system 10 according to one example. The quantum computing system 10 includes a quantum computing device 12 that comprises a system memory 14 and a processor device 16, and also includes a quantum computing device 18 that includes a system memory 20 and a processor device 22. It is to be understood that the quantum computing system 10 according to some examples may include other classical computing devices and/or additional quantum computing devices that are not illustrated in FIG. 1. Additionally, the quantum computing device 12 and the quantum computing device 18 in some examples may include constituent elements in addition to those illustrated in FIG. 1.

The quantum computing device 12 and the quantum computing device 18 may be close in physical proximity to one another, or may be relatively long distances from one another (e.g., hundreds or thousands of miles from one another). The quantum computing device 12 and the quantum computing device 18 operate in quantum environments, but can operate using classical computing principles or quantum computing principles. When using quantum computing principles, the quantum computing device 12 and the quantum computing device 18 perform computations that utilize quantum-mechanical phenomena, such as superposition and/or entanglement states. The quantum computing device 12 and the quantum computing device 18 each may operate under certain environmental conditions, such as at or near zero degrees (0°) Kelvin. When using classical computing principles, the quantum computing device 12 and the quantum computing device 18 utilize binary digits that have a value of either zero (0) or one (1). The quantum computing device 12 and the quantum computing device 18 may be communicatively coupled via a conventional classical network connection (not shown) and/or via a quantum channel (not shown) over which qubits may be transmitted.

The quantum computing device 12 and the quantum computing device 18 of FIG. 1 together implement a quantum file management system, components of which are distributed among one or more of the quantum computing device 12 and the quantum computing device 18. The quantum file management system includes quantum file managers 24 and 26, which operate to implement quantum files on the quantum computing device 12 and the quantum computing device 18, respectively. The quantum file management system also includes a quantum file registry 28 that includes metadata regarding each quantum file implemented in the quantum computing system 10, as discussed in greater detail below.

In the example of FIG. 1, the quantum computing system 10 implements a quantum file 30 that is made up of two (2) qubits: a qubit 32 that is hosted on the quantum computing device 12, and a qubit 34 that is hosted on the quantum computing device 18. For purposes of this example, the quantum file 30 is "owned" by the quantum computing device 12. However, it is to be understood that ownership of the quantum file 30 may be migrated or transitioned from one quantum computing device to another. It is to be further understood that the quantum file 30 in some examples may comprise more qubits than illustrated in FIG. 1.

The quantum computing device 12 includes a file system 36 that includes one or more quantum file references 38(0)-38(R). Each of the quantum file references 38(0)-38(R) corresponds to a quantum file that is maintained in the quantum file registry 28 and that is "owned" by the quantum computing device 12. Thus, for example, the quantum file reference 38(0) may correspond to the quantum file 30. Likewise, the quantum computing device 18 includes a file system 40 that includes one or more quantum file references 42(0)-42(F). It is to be understood that the file system 40 provides functionality corresponding to the functionality of the file system 36 described herein.

In exemplary operation, a quantum file such as the quantum file 30 may be accessed by a requestor (e.g., a quantum application 44) via the quantum file reference 38(0), which is identified by the quantum application 44 via an identifier (not shown). The quantum application 44 provides the identifier to the quantum file manager 24 via any suitable inter-process communications mechanism, such as an application programming interface (API) or the like. In some examples, the quantum file manager 24 may be an integral part of a quantum operating system, and the appropriate intercommunication mechanisms between the quantum application 44 and the quantum file manager 24 may be generated in response to certain programming instructions, such as reading, writing, or otherwise accessing the quantum file 30 while the quantum application 44 is being compiled.

The quantum file manager 24 then accesses the file system 36. Based on the quantum file identifier provided by the quantum application 44, the quantum file manager 24 accesses the quantum file reference 38(0). The quantum file reference 38(0) includes information about the quantum file 30 such as an owner of the quantum file 30, an internal quantum file identifier for the quantum file 30, a location of a Quantum Assembly Language (QASM) file that contains programming instructions that access the quantum file 30, and/or metadata for the quantum file 30 (e.g., a creation timestamp of the quantum file 30, a last modification timestamp of the quantum file 30, and/or a current user of the quantum file 30, as non-limiting examples). The quantum file reference 38(0) may also identify each qubit that makes up the quantum file 30 (i.e., the qubits 32 and 34, in this example).

In some examples, data may be spread over the qubits 32 and 34 of the quantum file 30 in a manner that dictates that the qubits 32 and 34 must be accessed in some sequential order for the data to have contextual meaning. Accordingly, some examples may provide that the order in which the qubits 32 and 34 are identified in the quantum file reference 38(0) may correspond to the appropriate order in which the qubits 32 and 34 should be accessed. In other examples, the quantum file reference 38(0) may have one or more additional fields identifying the appropriate order. Some examples may also provide that the quantum file reference 38(0) includes qubit entanglement indicators that indicate entanglement status information about the qubits 32 and 34, quantum superposition indicators that indicate superposition status information about the qubits 32 and 34, and/or superdense indicators that indicate superdense status information about the qubits 32 and 34.

In the example of FIG. 1, the quantum file manager 24, upon receiving an access request to a quantum file such as the quantum file 30, may access the quantum file registry 28 (using, e.g., a linking service (not shown)) to determine a current status of the quantum file 30. The quantum file registry 28 of FIG. 1 comprises a plurality of quantum file registry records 46, 48, and 50, each of which corresponds to a quantum file implemented in the quantum computing system 10. In this example, the quantum file registry record 46 corresponds to the quantum file 30.

The quantum file registry records 46, 48, and 50 include current metadata regarding the corresponding quantum files. The metadata may include, as non-limiting examples, an owner of each corresponding quantum file, an internal file identifier of each corresponding quantum file, an indicator of a number of qubits that make up the corresponding quantum file, and, for each qubit of the number of qubits, a qubit identifier field. The quantum file registry records 46, 48, and 50 each may also include additional metadata, such as, by way of non-limiting example, a creation timestamp of the corresponding quantum file, a last modification timestamp of the corresponding quantum file, a current user (e.g., current quantum application or current quantum service) of the corresponding quantum file, and the like. Some examples may also provide that the quantum file registry records 46, 48, and 50 each further include qubit entanglement status fields, quantum superposition status fields, and/or superdense status fields for each qubit of the corresponding quantum file.

The quantum file manager 24 updates the quantum file reference 38(0) with the information from the quantum file registry record 46 and the outcome of any checks, and also updates the timestamp field of the quantum file reference 38(0) with the current time. The quantum file manager 24 then returns control to the quantum application 44, passing the quantum application 44 at least some of the updated information contained in the quantum file reference 38(0). The quantum application 44 may then initiate actions against the qubits 32 and 34, such as read actions, write actions, or the like.

One function provided by the quantum file managers 24 and 26 of FIG. 1 is quantum file permission management. Accordingly, in the example of FIG. 1, the quantum computing device 12 implements a quantum file permissions service 52 that provides functionality for accessing and/or updating a permissions status of the quantum file 30. The quantum file permissions service 52 is executed by the processor device 16, and receives a permissions query ("PERM QUERY") 54 from a requestor, such as the quantum application 44, for a permissions status of the quantum file 30. The permissions query 54 may include an identifier of the quantum file 30 (not shown), and, in some examples, may further include an identifier of one or more of the qubits 32 and 34 of the quantum file 30. Elements of the permissions query 54 according to some examples are discussed in greater detail below with respect to FIG. 2A.

Upon receiving the permissions query 54, the quantum file permissions service 52 accesses permissions information for the quantum file 30 from a permissions database 56. As discussed in greater detail below with respect to FIG. 3, the permissions information stored in the permissions database 56 may include a plurality of permissions database entries (not shown) that each provide indicators of read permissions, write permissions, and execute permissions for a corresponding quantum file, such as the quantum file 30. After accessing the permissions information for the quantum file 30 from the permissions database 56, the quantum file permissions service 52 determines a permissions status 58 for the quantum file 30. The permissions status 58 may include one or more of a read permission indicator 60, a write permission indicator 62, and an execute permission indicator 64 for the quantum file 30. In some examples, the read permission indicator 60, the write permission indicator 62, and the execute permission indicator 64 each indicates whether or not the respective permission is enabled for the quantum file 30. The read permission indicator 60, the write permission indicator 62, and the execute permission indicator 64 of the permissions status 58 each may indicate the respective permission for a specific user (not shown) of the quantum computing system, a specific user group (not shown) of the quantum computing system, and/or all users of the quantum computing system. The quantum file permissions service 52 then sends a response 66 to the quantum application 44 indicating the permissions status 58.

In some examples, the ability of an entity such as the quantum application 44 to read, write, and/or execute the quantum file 30 may depend on other factors in addition to the quantum-file-level permissions information stored in the permissions database 56. For instance, determining whether or not the quantum application 44 can write to the quantum file 30 may depend not only on the write permission indicated by the permissions database 56, but also on factors such as the following: which entity owns the quantum file 30; whether or not the quantum file 30 is in use; the entanglement, superposition, and superdense status of the qubits 32 and 34; and/or the location of the qubits 32 and 34.

Accordingly, the quantum file permissions service 52 according to some examples may base its determination of the permissions status 58 of the quantum file 30 not only on the permissions database 56, but also on additional information accessed by the quantum file permissions service 52. In some examples, the quantum file permissions service 52 may access an indicator of ownership of the quantum file 30 and/or an indicator of whether the quantum file 30 is in use. Some examples may provide that the quantum file permissions service 52 may access one or more of an indicator of an entanglement status of the qubits 32 and 34, an indicator of a superposition status of the qubits 32 and 34, and an indicator of a superdense status of the qubits 32 and 34. According to some examples, the quantum file permissions service 52 may access an indicator of whether each of the qubits 32 and 34 is stored locally by the quantum computing device 12. The quantum file permissions service 52 may access the above-described indicators by accessing, e.g., the quantum file reference 38(0) of the file system 36 and/or the quantum file registry record 46 of the quantum file registry 28, as non-limiting examples. The quantum file permissions service 52 in some examples may access the above-described indicators for the qubits 32 and 34 based on an identifier of one or more of the qubits 32 and 34 provided as part of the permissions query 54, or may automatically access the above-described indicators for all of the qubits 32 and 34 as part of determining the permissions status 58 of the quantum file 30.

The quantum file permissions service 52 may then determine the permissions status 58 of the quantum file 30 based on both the permissions database 56 as well as the additional indicator(s). For example, the permissions database 56 may indicate that a given user has read permissions for the quantum file 30, but the quantum file permissions service 52 may further determine that the qubits 32 and 34 of the quantum file 30 are in a state of entanglement, superposition, and/or superdensity such that accesses to the qubits 32 and 34 should be disallowed to preserve the current state of the qubits 32 and 34. The quantum file permissions service 52 thus may determine that the permissions status 58 should include the read permission indicator 60 having a value that indicates that reads to the quantum file 30 by the quantum application 44 are disallowed. The ownership and current use of the quantum file 30 and/or the locations of the qubits 32 and 34 may similarly be taken into consideration by the quantum file permissions service 52 in determining the permissions status 58 of the quantum file 30.

In some examples, the quantum file permissions service 52 may also provide functionality for updating the permissions database 56 to modify permissions for a quantum file such as the quantum file 30. Accordingly, the quantum file permissions service 52 may receive a permissions update request ("PERM UPDATE REQUEST") 68 from a requestor such as the quantum application 44. While not shown in FIG. 1, the permissions update request 68 may include an identifier of the quantum file 30, a permissions identifier corresponding to the specific permissions to be updated, and an updated permissions value. Constituent elements of the permissions update request 68 are discussed in greater detail below with respect to FIG. 2B. In response to receiving the permissions update request 68, the quantum file permissions service 52 may update a permissions database entry corresponding to the quantum file 30 in the permissions database based on the permissions update request 68. For example, the quantum file permissions service 52 may write the updated permissions value into the permissions database entry corresponding to the quantum file 30. In some examples, operations for updating the permissions for the quantum file 30 may further include updating a corresponding file definition mechanism, such as a QASM file, for the quantum file 30.

Figure 2B:
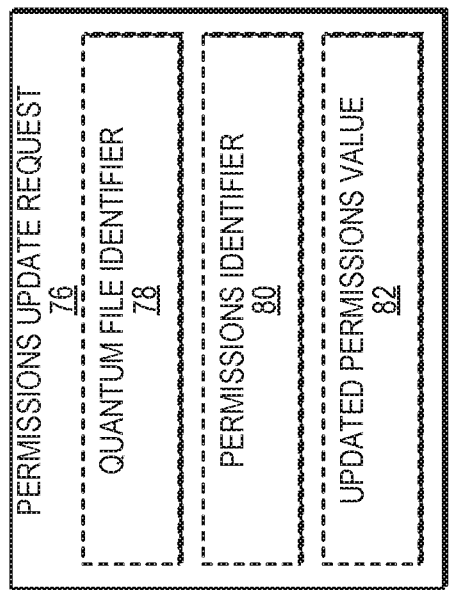
FIGS. 2A and 2B are block diagrams illustrating constituent elements of a permissions query and a permissions update request, respectively, of FIG. 1, according to some examples.
Figure 2A:
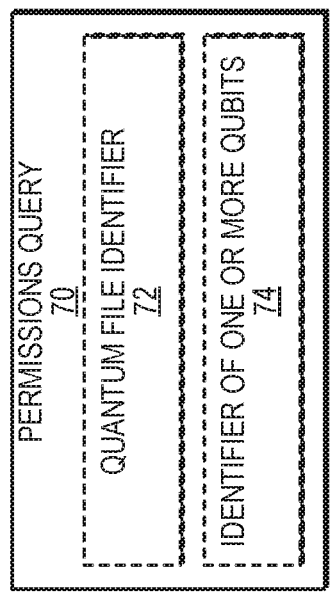

To illustrate constituent elements of the permissions query 54 and the permissions update request 68 of FIG. 1 according to some examples, FIGS. 2A and 2B are provided. In FIG. 2A, a permissions query 70, corresponding in functionality to the permissions query 54 of FIG. 1, is shown. The permissions query 70 includes a quantum file identifier 72 that identifies the quantum file for which permissions are requested. The quantum file identifier 72 may correspond to, e.g., the quantum file identifiers included in the quantum file references 38(0)-38(R) and/or the quantum file registry records 46, 48, and 50 of FIG. 1. The permissions query 70 of FIG. 2A may also include an identifier 74 of one or more qubits of the quantum file identified by the quantum file identifier 72. The identifier 74 may be specified in examples in which a location or state (e.g., an entanglement state, a superposition state, and/or a superdense state) of the one or more qubits may have an effect on how the requested permission status is determined by the quantum file permissions service 52 of FIG. 1. The identifier 74 may correspond to, e.g., qubit identifier fields of the quantum file registry records 46, 48, and 50 of FIG. 1. It is to be understood that the permissions query 70 of FIG. 2A may include other elements in place of or in addition to the elements illustrated in FIG. 2A.

Referring now to FIG. 2B, a permissions update request 76, corresponding in functionality to the permissions update request 68 of FIG. 1, is shown. The permissions update request 76 may include a quantum file identifier 78 having characteristics corresponding to the quantum file identifier 72 of FIG. 2A. The permissions update request 76 may further include a permissions identifier 80 that identifies a permission (e.g., a read permission, a write permission, or an execute permission, as non-limiting examples) to be modified by the quantum file permissions service 52 of FIG. 1. The permissions update request 76 of FIG. 2B may also include an updated permissions value 82, which specifies the desired value (e.g., set or not set) for the permission corresponding to the permissions identifier 80. It is to be understood that the permissions update request 76 of FIG. 2B may include other elements in place of or in addition to the elements illustrated in FIG. 2B.

FIG. 3 illustrates constituent elements of the permissions database 56 of FIG. 1 according to some examples. In FIG. 3, a permissions database 84, corresponding in functionality to the permissions database 56 of FIG. 1, is shown. The permissions database 84 include a plurality of permissions database entries 86(0)-86(P), each of which corresponds to a quantum file such as the quantum file 30 of FIG. 1. Each of the permissions database entries 86(0)-86(P) includes a corresponding quantum file identifier 88(0)-88(P) that identifies a quantum file for which permissions are stored. The quantum file identifiers 88(0)-88(P) in some examples may correspond to, e.g., the quantum file identifiers included in the quantum file references 38(0)-38(R) and/or the quantum file registry records 46, 48, and 50 of FIG. 1.

In the example of FIG. 3, the permissions database entries 86(0)-86(P) also include respective read permission indicators 90(0)-90(P), write permission indicators 92(0)-92(P), and execute permission indicators 94(0)-94(P) to indicate file system permissions for the quantum files corresponding to the permissions database entries 86(0)-86(P). The read permission indicators 90(0)-90(P), write permission indicators 92(0)-92(P), and execute permission indicators 94(0)-94(P) in some examples may comprise a bit indicator or flag, and may indicate permissions for a specific user, for a specific user group, or for all users of the corresponding quantum files. While not shown in FIG. 3, some examples may provide that the permissions database entries 86(0)-86(P) each may include multiple sets of read permission indicators 90(0)-90(P), write permission indicators 92(0)-92(P), and execute permission indicators 94(0)-94(P), with each set of permissions indicators indicating file system permissions for a specific user, for a specific user group, and/or for all users, respectively, of the corresponding quantum file. It is to be understood that the permissions database entries 86(0)-86(P) of FIG. 3 may include other elements in place of or in addition to the elements illustrated in FIG. 3.

Figure 4A:
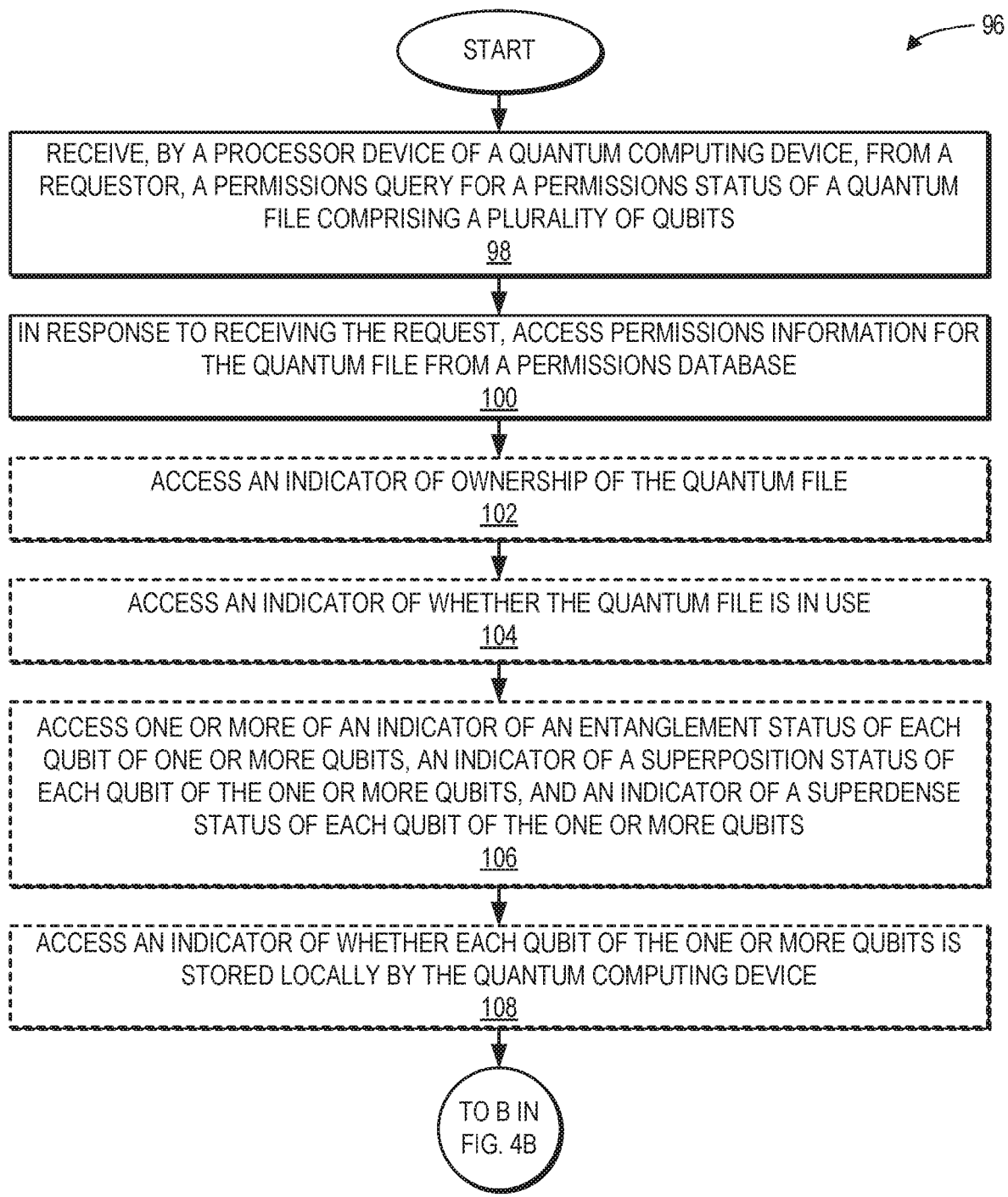
FIGS. 4A and 4B are flowcharts illustrating operations for receiving and processing a permissions query for a permissions status of a quantum file, according to one example.
Figure 4B:
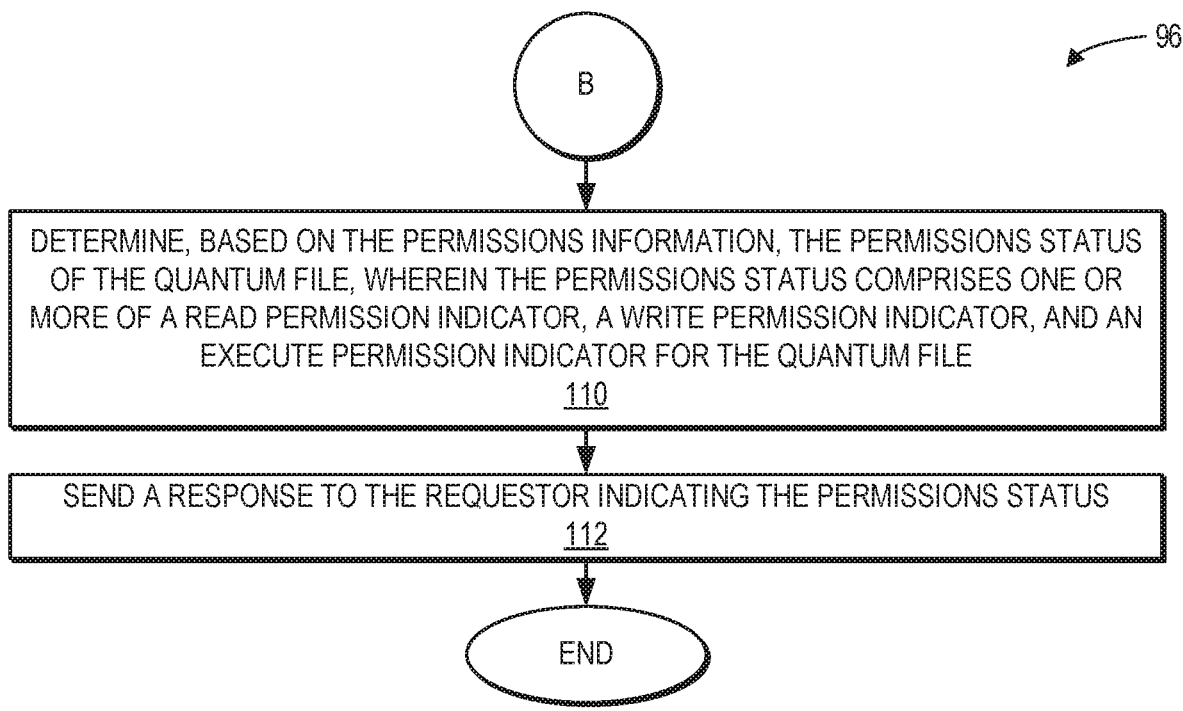

FIGS. 4A and 4B provide a flowchart 96 showing exemplary operations for providing quantum file permissions, according to some examples. For the sake of clarity, elements of FIG. 1 are referenced in describing FIGS. 4A and 4B. Operations in FIG. 4A begin with the processor device 16 of the quantum computing device 12 (e.g., by executing the quantum file permissions service 52 of FIG. 1) receiving, from a requestor (such as the quantum application 44 ("requestor 44")), the permissions query 54 for the permissions status 58 of the quantum file 30 comprising the plurality of qubits 32, 34 (block 98). In response to receiving the request, the quantum file permissions service 52 accesses permissions information for the quantum file 30 from the permissions database 56 (block 100).

In some examples, the quantum file permissions service 52 may further access an indicator of ownership of the quantum file 30 (block 102). The quantum file permissions service 52 according to some examples may also access an indicator of whether the quantum file 30 is in use (block 104). Some examples may provide that the quantum file permissions service 52 additionally accesses one or more of an indicator of an entanglement status of each qubit of one or more qubits 32, 34, an indicator of a superposition status of each qubit of the one or more qubits 32, 34, and an indicator of a superdense status of each qubit of the one or more qubits 32, 34 (block 106). The quantum file permissions service 52 in some examples may further access an indicator of whether each qubit of the one or more qubits 32, 34 is stored locally by the quantum computing device 12 (block 108). Processing then continues at block 110 of FIG. 4B.

Referring now to FIG. 4B, the quantum file permissions service 52 next determines, based on the permissions information, the permissions status 58 of the quantum file 30, wherein the permissions status 58 comprises one or more of a read permission indicator 60, a write permission indicator 62, and an execute permission indicator 64 for the quantum file 30 (block 110). The quantum file permissions service 52 then sends the response 66 to the requestor 44 indicating the permissions status 58 (block 112).

Figure 5:
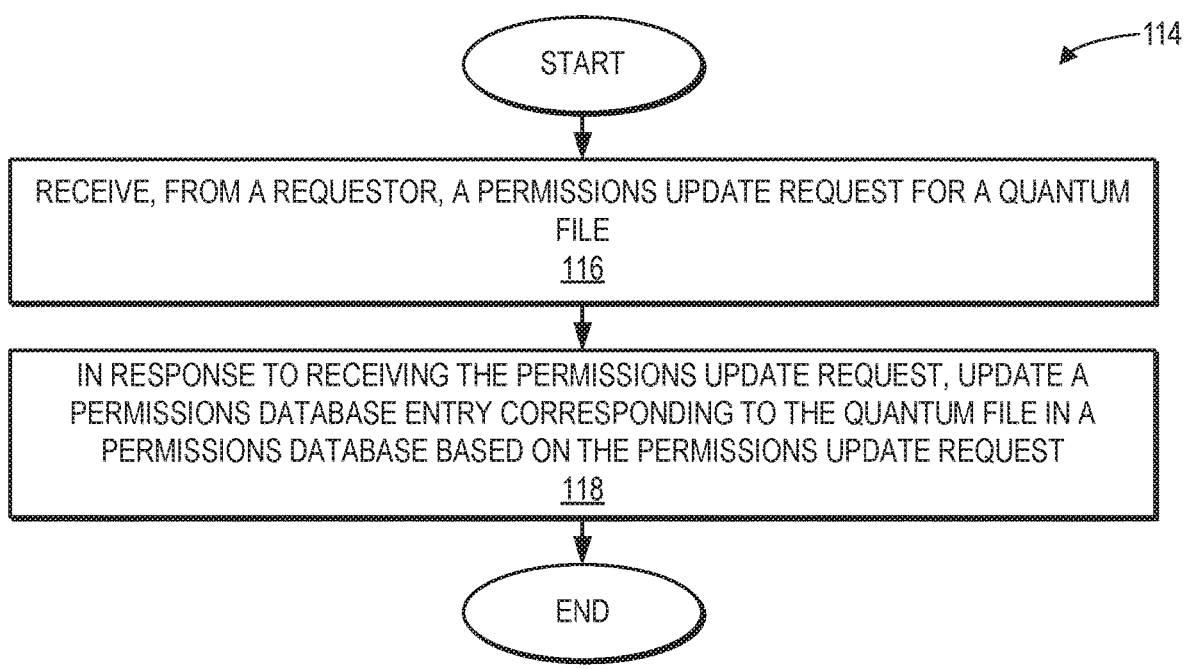
FIG. 5 is a flowchart illustrating operations for updating a permissions status of a quantum file, according to one example.

To illustrate operations for updating a permissions status of a quantum file according to one example, FIG. 5 provides a flowchart 114. For the sake of clarity, elements of FIGS. 1 and 3 are referenced in describing FIG. 5. In FIG. 5, operations begin with the quantum file permissions service 52 receiving, from a requestor (such as the quantum application 44 ("requestor 44")), the permissions update request 68 for the quantum file 30 (block 116). In response to receiving the permissions update request 68, the quantum file permissions service 52 updates a permissions database entry (such as the permissions database entries 86(0)-86(P) of FIG. 3) corresponding to the quantum file 30 in the permissions database 56 based on the permissions update request 68 (block 118).

Figure 6:
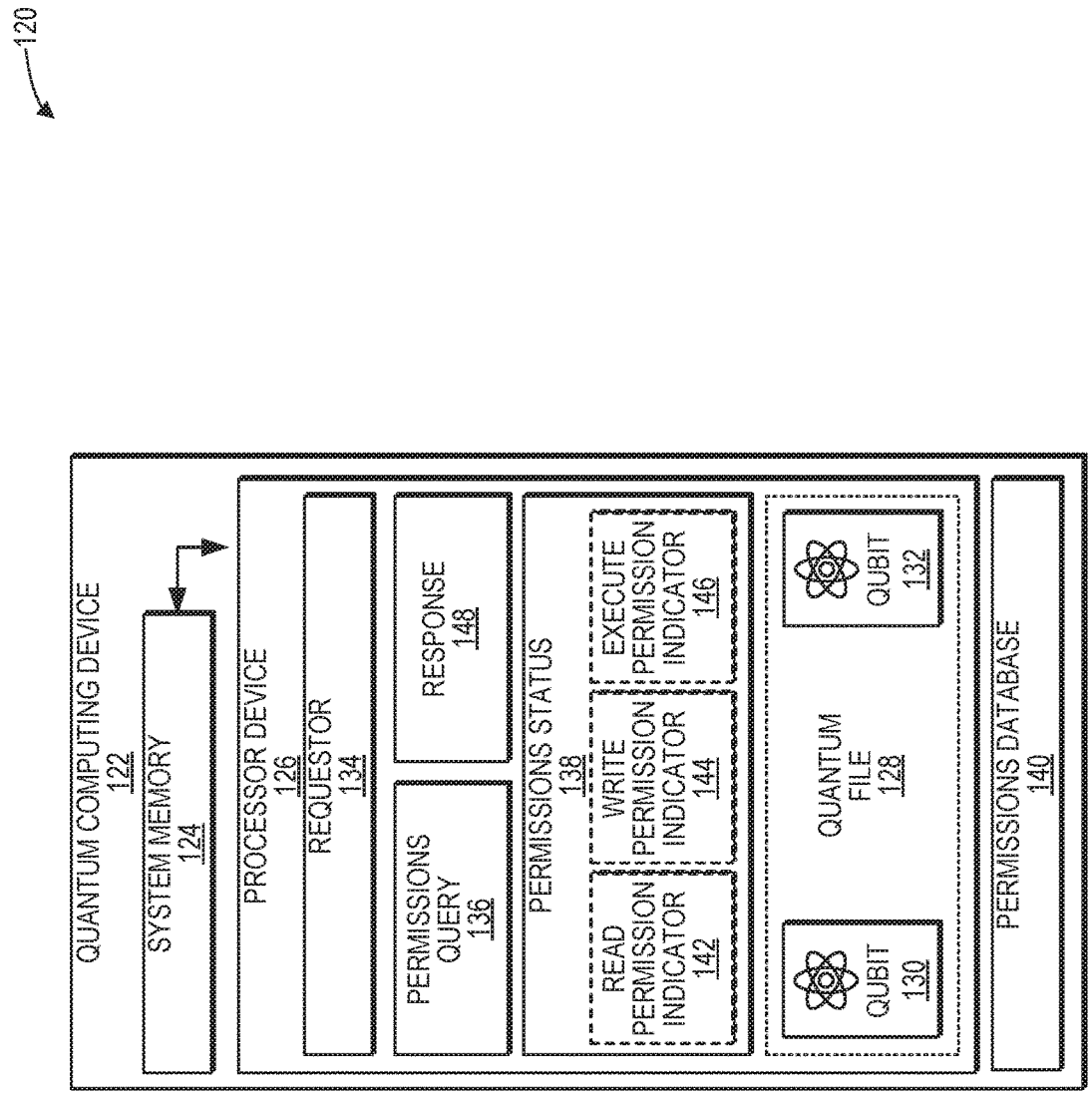
FIG. 6 is a simpler block diagram of the quantum computing system of FIG. 1 for implementing quantum file permissions, according to one example.

FIG. 6 is a simpler block diagram of the quantum computing system 10 of FIG. 1 for performing quantum file pattern searching, according to one example. In the example of FIG. 6, a quantum computing system 120 includes a quantum computing device 122 that comprises a system memory 124 and a processor device 126. The quantum computing system 120 implements a quantum file 128 that is made up of two (2) qubits: a qubit 130 and a qubit 132.

The processor device 126 implements quantum file permissions and receives, from a requestor 134, a permissions query 136 for a permissions status 138 for the quantum file 128 comprising the plurality of qubits 130 and 132. In response to receiving the permissions query 136, the processor device 126 accesses permissions information for the quantum file 128 from a permissions database 140. The processor device 126 determines, based on the permissions information, the permissions status 138, wherein the permissions status 138 comprises one or more of a read permission indicator 142, a write permission indicator 144, and an execute permission indicator 146 for the quantum file 128. The processor device 126 then sends a response 148 to the requestor 134 indicating the permissions status 138.

Figure 7:
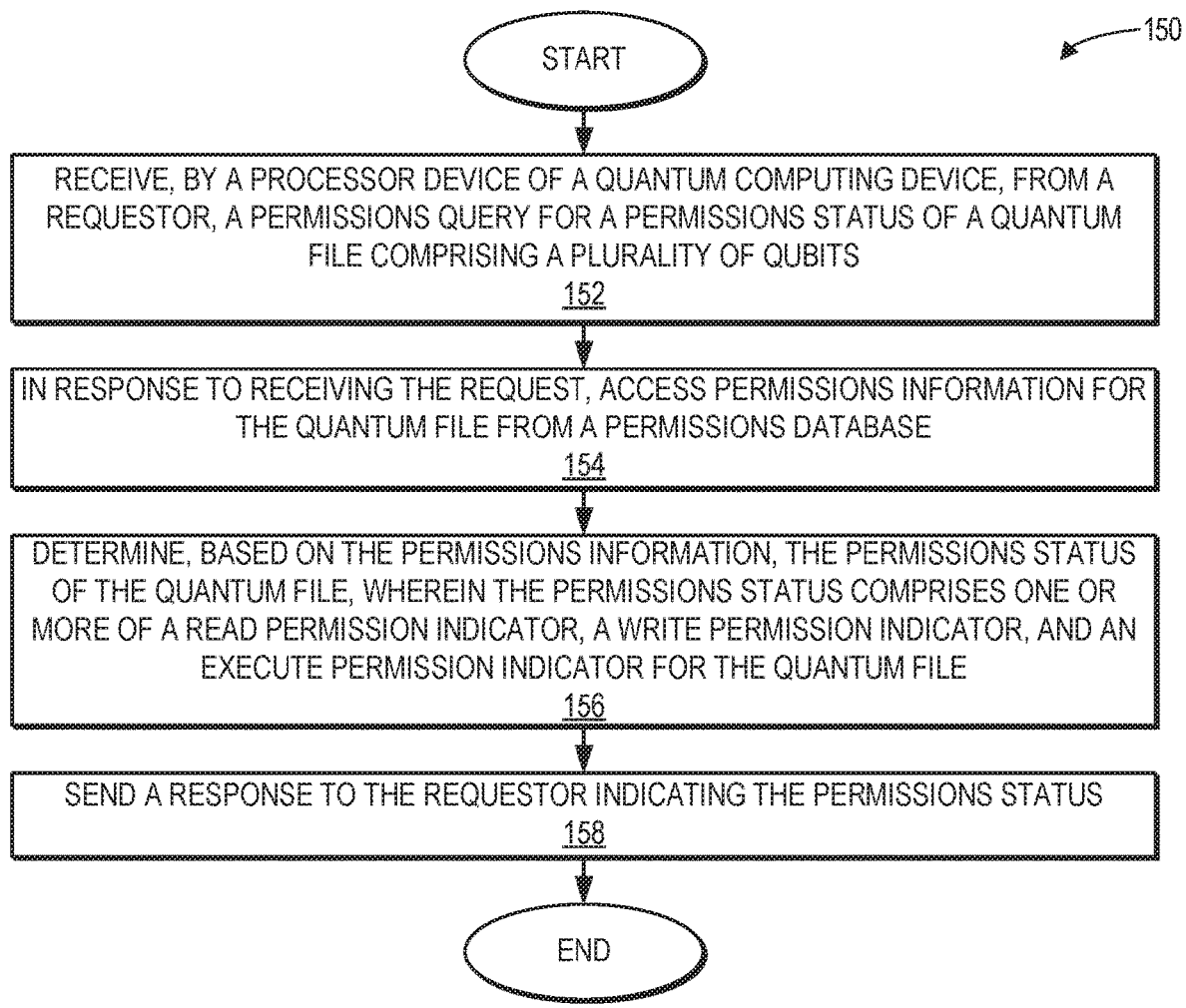
FIG. 7 is a flowchart of a simplified method for providing quantum file permissions in the quantum computing system of FIG. 6, according to one example.

FIG. 7 provides a flowchart 150 of a simplified method for providing a quantum file permission system in the quantum computing system 120 of FIG. 6, according to one example. For the sake of clarity, elements of FIG. 6 are referenced in describing FIG. 7. In FIG. 7, operations begin with the processor device 126 of the quantum computing device 122 receiving, from the requestor 134, the permissions query 136 for the permissions status 138 of the quantum file 128 comprising the plurality of qubits 130 and 132 (block 152). In response to receiving the request, the processor device 126 accesses permissions information for the quantum file 128 from the permissions database 140 (block 154). The processor device 126 next determines, based on the permissions information, the permissions status 138 of the quantum file 128, wherein the permissions status 138 comprises one or more of the read permission indicator 142, the write permission indicator 144, and the execute permission indicator 146 for the quantum file 128 (block 156). The processor device 126 then sends the response 148 to the requestor 134 indicating the permissions status 138 (block 158).

Figure 8:
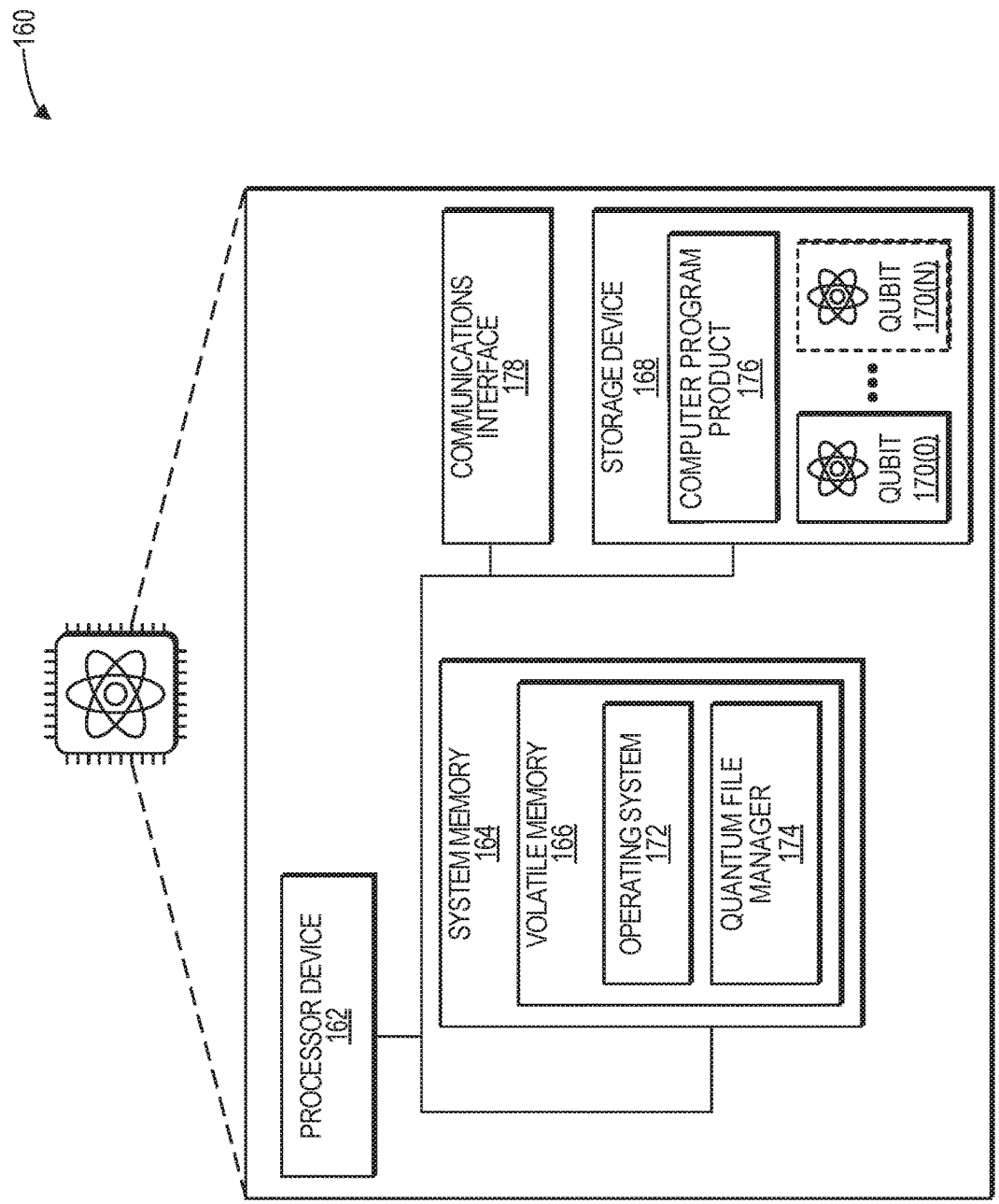
FIG. 8 is a block diagram of a quantum computing device suitable for implementing examples, according to one example.

FIG. 8 is a block diagram of a quantum computing device 160, such as the quantum computing device 12 and the quantum computing device 18 of FIG. 1, suitable for implementing examples according to one example. The quantum computing device 160 may comprise any suitable quantum computing device or devices. The quantum computing device 160 can operate using classical computing principles or quantum computing principles. When using quantum computing principles, the quantum computing device 160 performs computations that utilize quantum-mechanical phenomena, such as superposition and entanglement. The quantum computing device 160 may operate under certain environmental conditions, such as at or near zero degrees (0°) Kelvin. When using classical computing principles, the quantum computing device 160 utilizes binary digits that have a value of either zero (0) or one (1).

The quantum computing device 160 includes a processor device 162 and the system memory 164. The processor device 162 can be any commercially available or proprietary processor suitable for operating in a quantum environment. The system memory 164 may include volatile memory 166 (e.g., random-access memory (RAM)). The quantum computing device 160 may further include or be coupled to a non-transitory computer-readable storage medium such as a storage device 168, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 168 and other drives associated with computer-readable media and computer-usable media may provide non-volatile storage of data, data structures, computer-executable instructions, and the like. The storage device may also provide functionality for storing one or more qubits 170(0)-170(N).

A number of modules can be stored in the storage device 168 and in the volatile memory 166, including an operating system 172 and one or more modules, such as a quantum file manager 174. All or a portion of the examples may be implemented as a computer program product 176 stored on a transitory or non-transitory computer-usable or computer-readable storage medium, such as the storage device 168, which includes complex programming instructions, such as complex computer-readable program code, to cause the processor device 162 to carry out the steps described herein. Thus, the computer-readable program code can comprise software instructions for implementing the functionality of the examples described herein when executed on the processor device 162. An operator may also be able to enter one or more configuration commands through a keyboard (not illustrated), a pointing device such as a mouse (not illustrated), or a touch-sensitive surface such as a display device. The quantum computing device 160 may also include a communications interface 178 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
receiving, by a processor device of a quantum computing device, from a requestor, a permissions query for a permissions status of a quantum file comprising a plurality of qubits, the permissions query comprising an identifier of the quantum file;
in response to receiving the permissions query; accessing permissions information for the quantum file from a permissions database, the permissions database including a plurality of permissions database entries for a plurality of quantum files, each of the plurality of quantum files comprising a plurality of qubits;
determining, based on the permissions information, the permissions status of the quantum file, wherein the permissions status comprises one or more of a read permission indicator, a write permission indicator, and an execute permission indicator for the quantum file; and
sending a response to the requestor indicating the permissions status.

2. The method of claim 1, further comprising accessing an indicator of ownership of the quantum file;
wherein determining the permissions status of the quantum file is further based on the indicator.

3. The method of claim 1, further comprising accessing an indicator of whether the quantum file is in use;
wherein determining the permissions status of the quantum file is further based on the indicator.

4. The method of claim 1, wherein the permissions query further comprises an identifier of one or more qubits of the plurality of qubits.

5. The method of claim 4, further comprising accessing one or more of an indicator of an entanglement status of each qubit of the one or more qubits, an indicator of a superposition status of each qubit of the one or more qubits, and an indicator of a superdense status of each qubit of the one or more qubits;
wherein determining the permissions status of the quantum file is further based on the one or more indicators.

6. The method of claim 4, further comprising accessing an indicator of whether each qubit of the one or more qubits is stored locally by the quantum computing device;
wherein determining the permissions status of the quantum file is further based on the indicator.

7. The method of claim 1, further comprising:
receiving, from the requestor, a permissions update request for the quantum file; and
in response to receiving the permissions update request, updating a permissions database entry corresponding to the quantum file in the permissions database based on the permissions update request.

8. A quantum computing system, comprising:
a quantum computing device comprising:
a memory; and
at least one processor device coupled to the memory to:
receive, from a requestor, a permissions query for a permissions status of a quantum file comprising a plurality of qubits, the permissions query comprises an identifier of the quantum file;
in response to receiving the permissions query, access permissions information for the quantum file from a permissions database, the permissions database including a plurality of permissions database entries for a plurality of quantum files, each of the plurality of quantum files comprising a plurality of qubits;
determine, based on the permissions information, the permissions status of the quantum file, wherein the permissions status comprises one or more of a read permission indicator, a write permission indicator, and an execute permission indicator for the quantum file; and
send a response to the requestor indicating the permissions status.

9. The quantum computing system of claim 8, wherein:
the at least one processor device is further to access an indicator of ownership of the quantum file; and
the at least one processor device is to determine the permissions status of the quantum file further based on the indicator.

10. The quantum computing system of claim 8, wherein:
the at least one processor device is further to access an indicator of whether the quantum file is in use; and
the at least one processor device is to determine the permissions status of the quantum file further based on the indicator.

11. The quantum computing system of claim 8, wherein the permissions query further comprises an identifier of one or more qubits of the plurality of qubits.

12. The quantum computing system of claim 11, wherein:
the at least one processor device is further to access one or more of an indicator of an entanglement status of each qubit of the one or more qubits, an indicator of a superposition status of each qubit of the one or more qubits, and an indicator of a superdense status of each qubit of the one or more qubits; and
the at least one processor device is to determine the permissions status of the quantum file further based on the one or more indicators.

13. The quantum computing system of claim 11, wherein:
the at least one processor device is further to access an indicator of whether each qubit of the one or more qubits is stored locally by the quantum computing device; and
the at least one processor device is to determine the permissions status of the quantum file further based on the indicator.

14. The quantum computing system of claim 8, wherein the at least one processor device is further to:
receive, from the requestor, a permissions update request for the quantum file; and
in response to receiving the permissions update request, update a permissions database entry corresponding to the quantum file in the permissions database based on the permissions update request.

15. A computer program product comprising a non-transitory computer-readable medium having stored thereon computer-executable instructions which, when executed, cause a processor device to:
receive, from a requestor, a permissions query for a permissions status of a quantum file comprising a plurality of qubits, the permissions query comprises an identifier of the quantum file;
in response to receiving the permissions query, access permissions information for the quantum file from a permissions database, the permissions database including a plurality of permissions database entries for a plurality of quantum files, each of the plurality of quantum files comprising a plurality of qubits;
determine, based on the permissions information, the permissions status of the quantum file, wherein the permissions status comprises one or more of a read permission indicator, a write permission indicator, and an execute permission indicator for the quantum file; and
send a response to the requestor indicating the permissions status.

16. The computer program product of claim 15, wherein:
the computer-executable instructions further cause the processor device to access an indicator of one or more of ownership of the quantum file and whether the quantum file is in use; and
the computer-executable instructions cause the processor device to determine the permissions status of the quantum file further based on the indicator.

17. The computer program product of claim 15, wherein:
the permissions query further comprises an identifier of one or more qubits of the plurality of qubits; and
the computer-executable instructions further cause the processor device to access one or more of an indicator of an entanglement status of each qubit of the one or more qubits, an indicator of a superposition status of each qubit of the one or more qubits, and an indicator of a superdense status of each qubit of the one or more qubits; and
the computer-executable instructions cause the processor device to determine the permissions status of the quantum file further based on the one or more indicators.

18. The method of claim 1, further comprising: in response to receiving the permissions query, accessing at least one of an indicator of a file system and an indicator of a quantum file registry.

19. The method of claim 18, wherein the determining the permission status of the quantum file is based on the permissions information and at least one of the indicator of a file system and the indicator of a quantum file registry.

20. The method of claim 19, wherein the accessing at least one of an indicator of a file system an indicator of a quantum file registry is performed by a quantum file permissions service, and wherein the sending a response to the requestor indicating the permissions status is performed by the quantum file permissions service.

* * * * *